United States Patent [19]

King et al.

[11] Patent Number: 5,005,847
[45] Date of Patent: Apr. 9, 1991

[54] FISHING CADDY APPARATUS

[76] Inventors: Ernest L. King, 2108 Squire Rd., Rock Hill, S.C. 29730; Lee R. Durham, Rte. 1, Box 26 T.F., Iron Station, N.C. 28080

[21] Appl. No.: 485,000

[22] Filed: Feb. 26, 1990

[51] Int. Cl.[5] .......................... B62B 1/12; B62B 1/26
[52] U.S. Cl. ................. 280/47.19; 280/47.28; 280/47.33; 280/204; 280/655; 224/922
[58] Field of Search ............ 280/47.17, 47.18, 47.19, 280/47.24, 47.28, 47.315, 47.33, 645, 652, 655, 655.1, 204, 42.27; 224/242, 269, 902, 922

[56] References Cited

U.S. PATENT DOCUMENTS

| | | | |
|---|---|---|---|
| 2,520,226 | 3/1950 | Smith | 280/652 |
| 2,659,042 | 11/1953 | Anderson et al. | 280/47.33 X |
| 2,835,503 | 5/1958 | Humphries et al. | 280/47.19 |
| 2,957,700 | 10/1960 | Beaurline | 280/655 X |
| 2,990,190 | 6/1961 | Eriksen | 280/655.1 X |
| 4,118,048 | 10/1978 | Spranger et al. | 280/47.315 X |
| 4,268,050 | 5/1981 | Kennedy, Sr. | 280/652 X |
| 4,311,262 | 1/1982 | Morin | 224/922 X |
| 4,457,527 | 7/1984 | Lowery | 280/47.19 |
| 4,625,949 | 12/1986 | Walker | 280/47.19 X |
| 4,832,362 | 5/1989 | Chen | 280/DIG. 6 X |

FOREIGN PATENT DOCUMENTS 2133977  8/1984  United Kingdom ............ 280/47.19

Primary Examiner—Andres Kashnikow
Assistant Examiner—Johnson Brian L.
Attorney, Agent, or Firm—Leon Gilden

[57] ABSTRACT

An apparatus including an upper tray orthogonally mounted to and directed rearwardly of a central post is spaced above a lower tray directed forwardly of the central post, with a plurality of wheels mounted to a rear edge portion of the lower tray. A triangular support stand is pivotally mounted to the support post and locked in a lowered or raised position. A handle member secured to a rear frame portion of the upper tray is pivotally and lockably mounted thereto, and includes an illumination member mounted in a spaced relationship to the handle. A battery support container mounted to the lower tray includes a battery therewithin for providing energy to the illumination member.

6 Claims, 4 Drawing Sheets

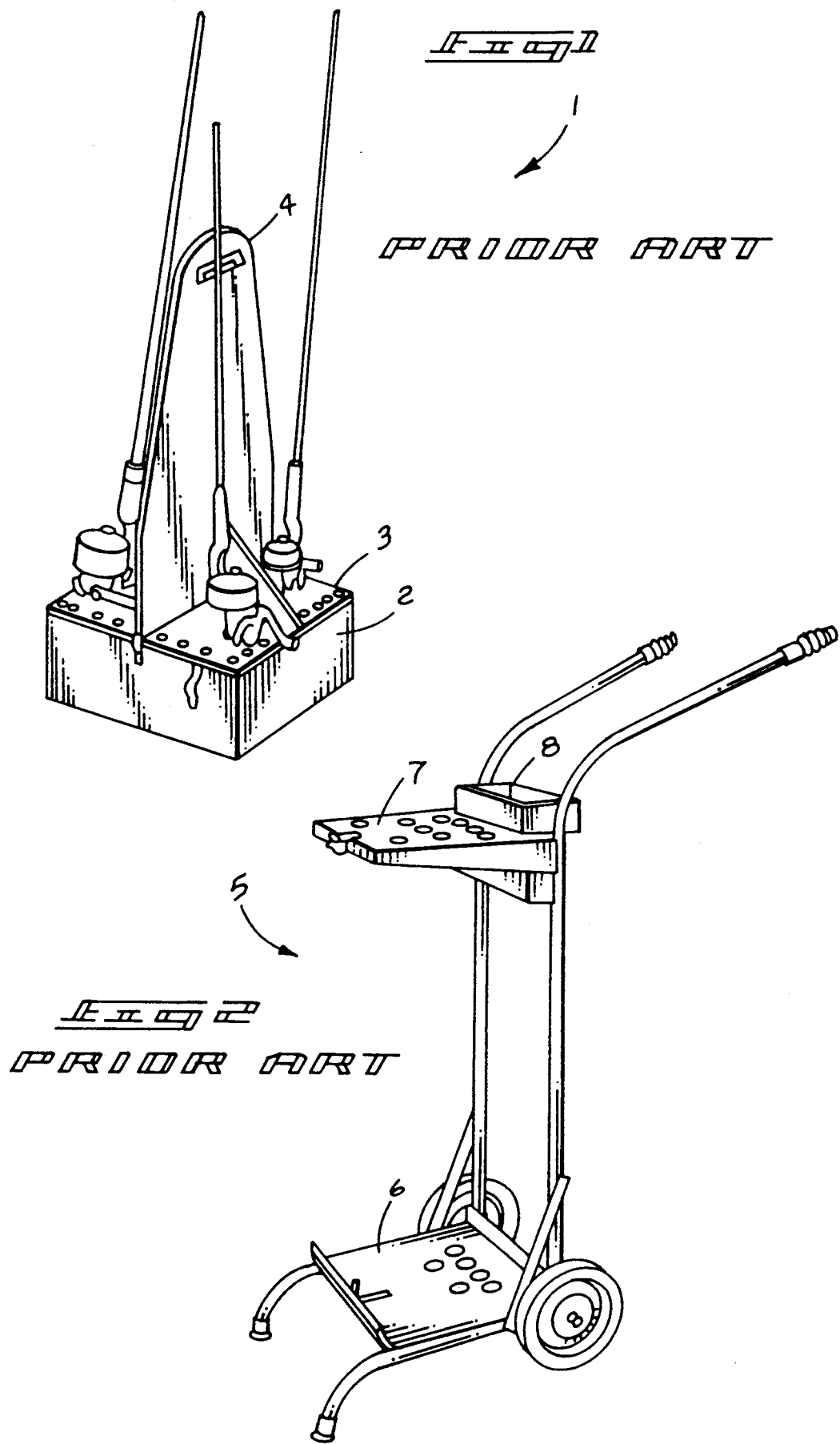

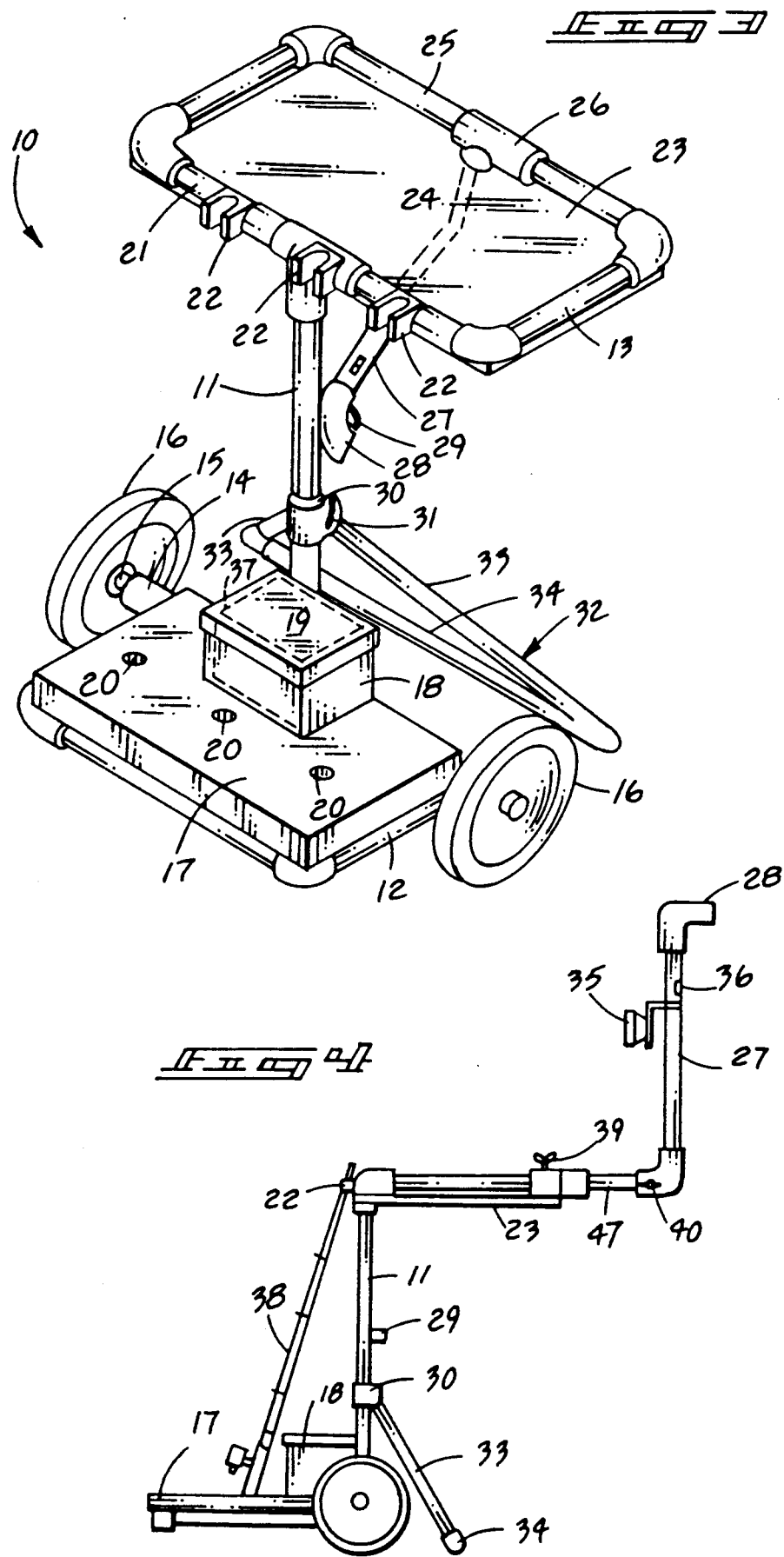

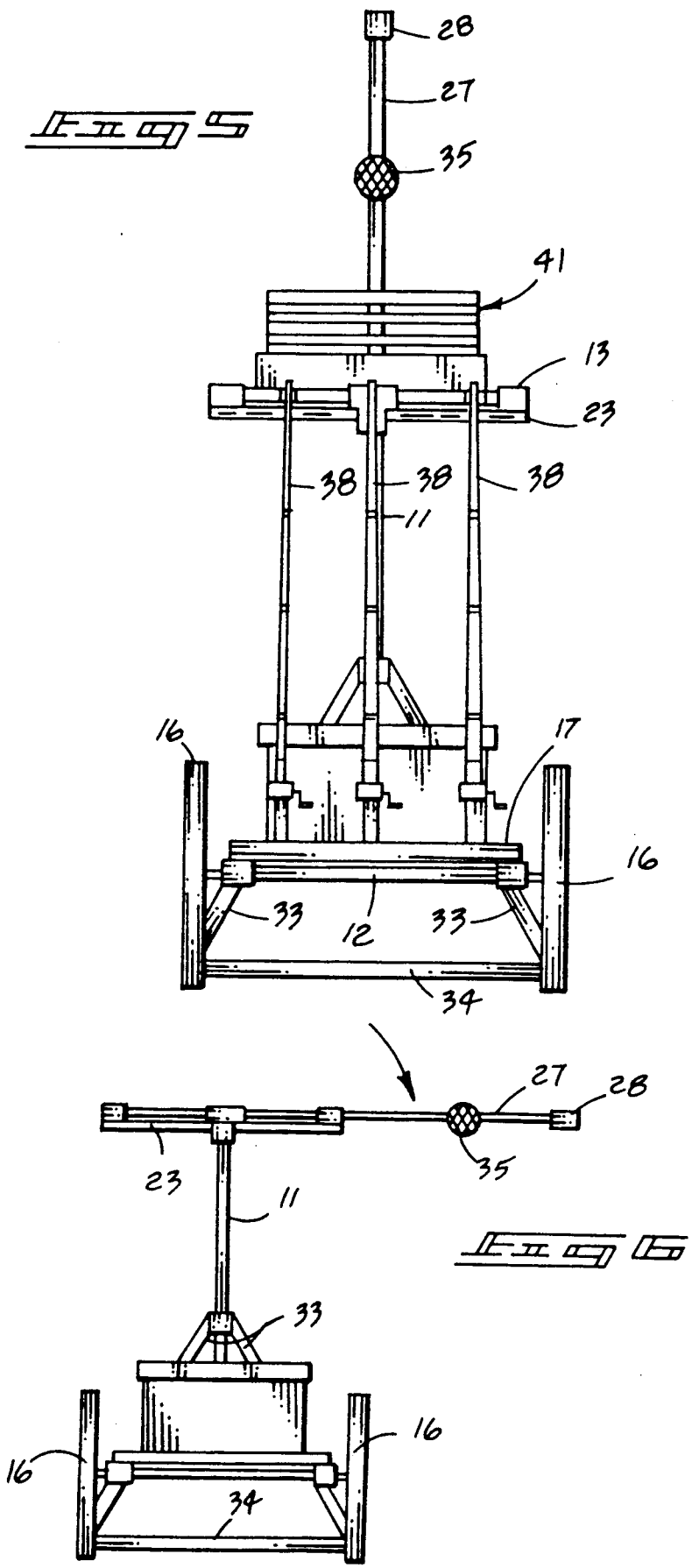

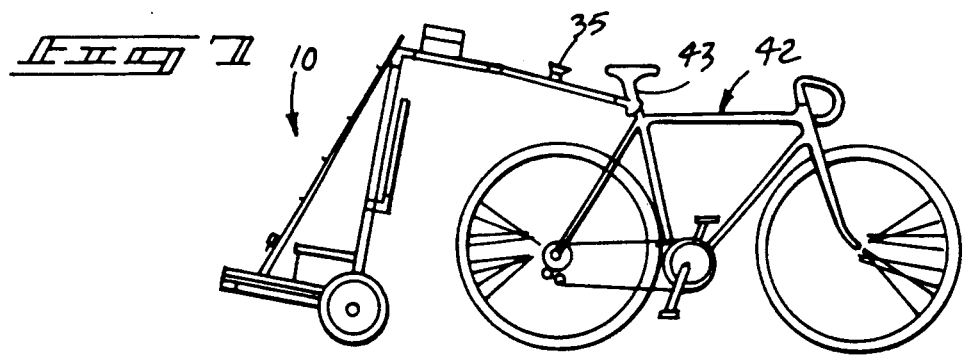
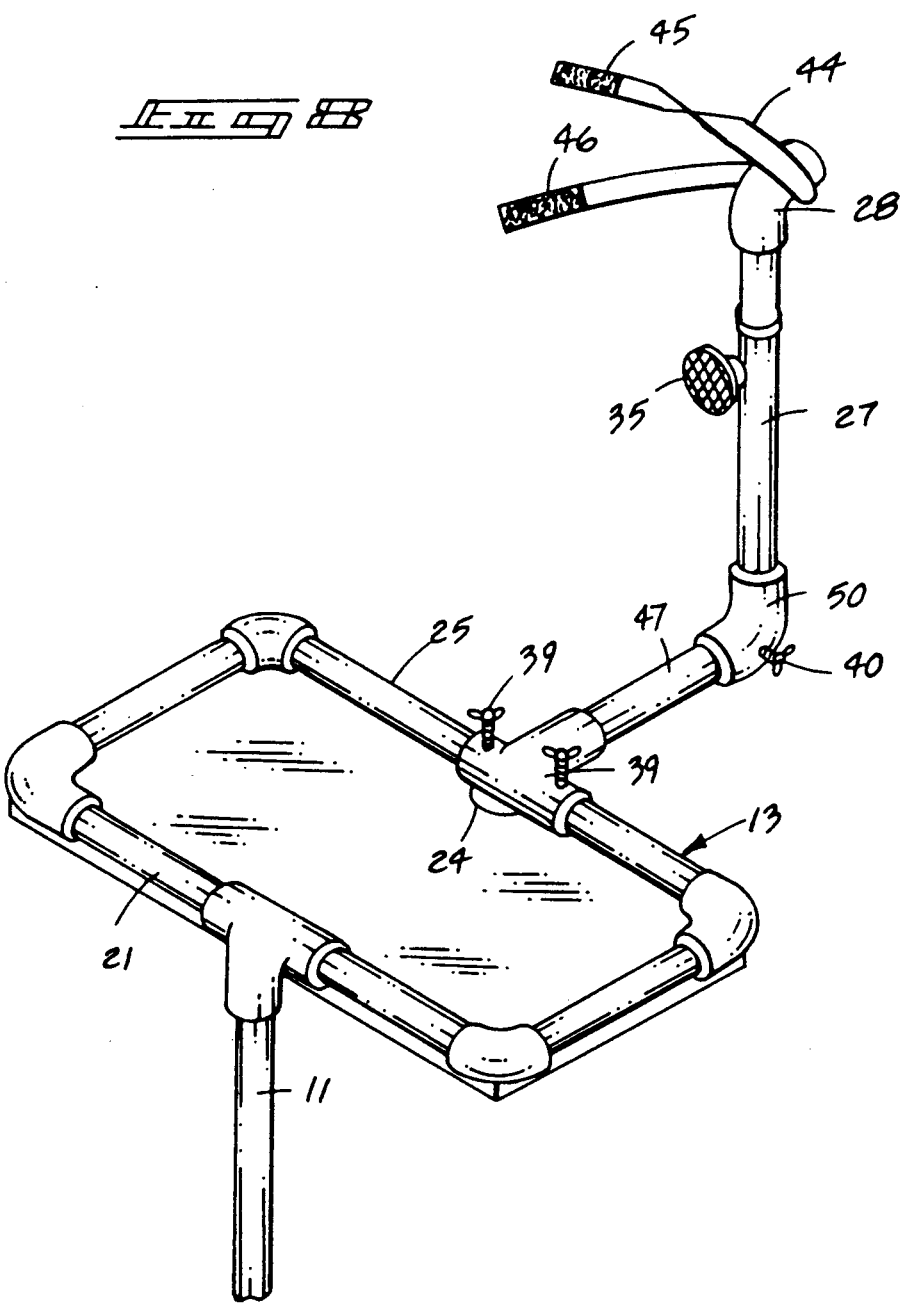

FISHING CADDY APPARATUS

BACKGROUND OF THE INVENTION

1. Field of the Invention

The field of invention relates to fishing apparatus, and more particularly pertains to a new and improved fishing caddy apparatus wherein the same presents a mobile and readily transportable support arrangement for use in a fishing environment.

2. Description of the Prior Art

Various fishing support structure has been utilized in the prior art for securement and positioning of various components during a fishing procedure. The instant invention attempts to overcome deficiencies of the prior art in providing an organization that provides storage for various fishing components, as well as utilizing a handle supporting an illumination means, with the handle pivotally mounted relative to the organization to permit orientation of the light as desired. Examples of the prior art include U.S. Pat. No. 4,311,262 to Morin wherein a fishing rod carrier device supports a plurality of rod handles within a container of the device, with a central plate directed upwardly of the container oriented for enabling manual support and transport of the organization.

U.S. Pat. No. 2,835,503 to Humphries, et al., sets forth a transport cart for use in a garden environment, wherein spaced trays are aligned in parallel and overlying relationship relative to one another to enable transport of various garden implements thereon.

U.S. Pat. No. 3,052,484 to Huffman, et al., sets forth a utility cart including a plurality of baskets mounted onto the cart, with the cart including a plurality of wheels mounted in a generally "L" shaped framework.

U.S. Pat. No. 4,696,122 to Van Der Zyl includes a plurality of racks mounted to a rod member to overlie a base. Fishing poles are stored within the racks and mounted upon the base in a storage relationship.

U.S. Pat. No. 1,790,711 to Johnston sets forth an apparatus for transport of an outboard motor, wherein a transport dolly includes a bracket member medially thereof for support of an outboard motor thereon.

As such, it may be appreciated that there continues to be a need for a new and improved fishing caddy apparatus wherein the same addresses the problems of ease of use, as well as effectiveness in construction in the transport and securement of various components utilized in a fishing situation.

SUMMARY OF THE INVENTION

In view of the foregoing disadvantages inherent in the known types of fishing apparatus now present in the prior art, the present invention provides a fishing caddy apparatus wherein the same includes an organization to enable securement and transport of items on the organization, as well as illumination means mounted for repositioning in association with the handle structure to permit illumination at various angular relationships, as desired by an individual. As such, the general purpose of the present invention, which will be described subsequently in greater detail, is to provide a new and improved fishing caddy apparatus which has all the advantages of the prior art fishing apparatus and none of the disadvantages.

To attain this, the present invention includes an upper tray orthogonally mounted to and directed rearwardly of a central post spaced above a lower tray and directed forwardly of the central post, with a plurality of wheels mounted to a rear edge portion of the lower tray. A triangular support stand is pivotally mounted to the support post and locked in a lowered or raised position. A handle member secured to a rear frame portion of the upper tray is pivotally and lockably mounted thereto, and includes an illumination member mounted in a spaced relationship to the handle. A battery support container mounted to the lower tray includes a battery therewithin for providing energy to the illumination member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing caddy apparatus which has all the advantages of the prior art fishing apparatus and none of the disadvantages.

It is another object of the present invention to provide a new and improved fishing caddy apparatus which may be easily and efficiently manufactured and marketed.

It is a further object of the present invention to provide a new and improved fishing caddy apparatus which is of a durable and reliable construction.

An even further object of the present invention is to provide a new and improved fishing caddy apparatus which is susceptible of a low cost of manufacture with regard to both materials and labor, and which accordingly is then susceptible of low prices of sale to the consuming public, thereby making such fishing caddy apparatus economically available to the buying public.

Still yet another object of the present invention is to provide a new and improved fishing caddy apparatus which provides in the apparatuses and methods of the prior art some of the advantages thereof, while simultaneously overcoming some of the disadvantages normally associated therewith.

Still another object of the present invention is to provide a new and improved fishing caddy apparatus wherein the same permits securement and positioning of various components utilized in a fishing scenario, as well as providing manually repositionable illumination means when the organization is utilized in a fixed orientation or arranged for transport.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art fishing caddy arrangement.

FIG. 2 is an isometric illustration of a prior art utility garden cart utilized for storage and transport of various elongate components.

FIG. 3 is an isometric illustration of the instant invention.

FIG. 4 is an orthographic side view taken in elevation of the instant invention.

FIG. 5 is an orthographic frontal view taken in elevation of the instant invention.

FIG. 6 is an orthographic frontal view taken in elevation of the instant invention illustrating the handle in a rotated relationship relative to the organization.

FIG. 7 is an orthographic side view taken in elevation of the instant invention in association with a bicycle to enable transport of the fishing caddy apparatus.

FIG. 8 is an isometric illustration of detail relative to the fastener strap utilized in association with the handle of the instant invention.

DESCRIPTION OF THE PREFERRED EMBODIMENT

With reference now to the drawings, and in particular to FIGS. 1 to 8 thereof, a new and improved fishing caddy apparatus embodying the principles and concepts of the present invention and generally designated by the reference numeral 10 will be described.

FIG. 1 illustrates a prior art fishing caddy apparatus 1 utilizing a storage container 2, with a lid 3 mounted thereon to secure fishing pole handles directed through apertures within the lid. An elongate flange including a handle aperture at an upper end thereof permits transport of the organization. FIG. 2 illustrates a further prior art caddy arrangement 5, with a lower support tray 6 and an upper support tray 7 in a parallel overlying relationship to the lower support tray, with a storage container 8 mounted thereon. The organization of FIG. 5 is for use with the transport and storage of various garden implements, as particularly set forth in U.S. Pat. No. 2,835,503.

More specifically, the fishing caddy apparatus 10 of the instant invention essentially comprises a central support post 11 vertically arranged, including a lower rectangular framework 12 orthogonally and forwardly directed relative to the central support post 11 at a lower terminal end of the support post. An upper rectangular framework 13 is orthogonally and fixedly secured to the central support post 11 at an upper terminal end thereof and directed rearwardly of the support post. Accordingly, a forward side 21 of the upper rectangular framework 13 is arranged to generally overlie a rear side of the lower rectangular framework 12. A support shaft 14, including an axle 15 rotatably mounted therewithin, is secured in an aligned configuration relative to the lower rectangular framework orthogonally bisected by the support post mounting a plurality of wheel members 16 at remote terminal ends of the axle 15 to enable rolling transport of the organization. A lower planar tray 17 defined by a first weight is arranged to overlie the lower rectangular framework 12 and configured to be coextensive therewith. A battery storage container 18 is mounted adjacent a rear side edge of the lower tray 17, with a lid 19 mounted thereon to fixedly secure a battery 37 therewithin. A series of aligned support apertures 20 are positioned forwardly of the battery storage container 18 and arranged generally parallel to the sides of the lower rectangular tray 17. The forward side 21 of the upper rectangular framework 13 includes a plurality of "U" shaped engagement members 22 of a like number as that of the support apertures 20. The engagement members 22 include forwardly directed pairs of legs aligned with a respective support aperture 20 to mount an associated fishing pole 38 within a lower aperture 20 and received within an upper aligned engagement member 22, as illustrated in FIGS. 4 and 5 for example. An upper tray 23 defined by a second weight less than that of the first weight to enhance stability of the organization is arranged coextensively with the upper rectangular framework 13 and is positioned to underlie the framework, as illustrated in FIG. 3. A recess 24 formed medially of a rear edge of the upper tray 23 permits reception and accommodation of an elongate handle leg 27 of the handle organization of the instant invention upon rotation of the handle leg 27 in a downward orientation, as illustrated in FIG. 3. The handle leg 27 is mounted within a handle collar 26 that is rotatably mounted medially of a rear side 25 of the upper rectangular framework 13, and includes a generally "L" shaped handle 28 mounted at a forward free terminal end of the handle leg 27 remote from the collar 26. The "L" shaped handle 28 is receivable within a spring clip 29 when the handle is in a downward or locked configuration, as illustrated in FIG. 3. A support stand collar 30 is mounted about the support post 11 and pivotally mounts a triangular support stand 32 thereto. A locking bolt and wing nut 31 fixedly secures the support stand 30 in a lowered configuration, as illustrated in FIGS. 3 and 4, or in a raised orientation, as illustrated in FIG. 7 for example. The support stand 32 includes spaced legs 33 joined at an apex and pivotally mounted at the apex to the support stand collar 30, with a base 34 arranged generally parallel to the forward and rear elongate sides of the lower rectangular framework 12 permitting sure positioning of the apparatus in a stationary configuration.

The handle 27 includes a flood light 35 mounted thereon, with a switch 36 mounted within the handle 27 spaced from the flood light 35. Electrical energy is accordingly directed in a conventional direct current relationship from the battery 37 through the switch 36 and to the flood light 35 selectively by a user thereof.

The handle organization includes a handle collar lock rod and wing nut organization 39 utilizing a single or plurality of such lock rods, as illustrated in FIG. 8 for example, to fixedly secure the collar in a predetermined orientation relative to the rear side of the upper rectangular framework 13. The handle includes a handle elbow mounted between the collar 26 and the handle leg 27. The elbow 50 spaces the handle leg 27 from the rear side of the upper rectangular framework 13 and includes at least a single handle elbow rod wing nut organization 40 to enable fixed orientation of the elongate handle leg 27 relative to the further handle leg 47.

Reference to FIG. 7 illustrates a bicycle 42 in association with a bicycle seat support rod 43. A fastener strap 44, including respective first and second hook and loop fastener patches 45 and 46 mounted at remote terminal ends of the fastener strap 44, permits surrounding engagement of the fastener strap 44 relative to the bicycle seat support rod 43 to permit transport of the organization by the bicycle.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing caddy apparatus comprising, in combination,
   a central support post orthogonally mounting a lower rectangular framework at a lowermost end thereof directed forwardly of the support post, and
   an upper rectangular framework directed rearwardly of the support post mounted to an upper terminal end of the support post, and
   an axle mounted to a rear side of the lower rectangular framework including a plurality of wheel members mounted to the axle to permit transport of the apparatus, and
   a handle means pivotally mounted to a rear side of the upper rectangular framework, and
   a spring locking clip mounted to a rear side wall of the support post, and
   the handle means rotatably mounted to the upper rectangular framework for selective engagement with the clip, and
   wherein the handle means comprises a handle collar rotatably mounted to the rear side of the upper rectangular framework, and a rotatably lock member to selectively lock the collar in a predetermined relationship relative to the rear side of the upper rectangular framework, and
   wherein the handle means further includes a handle leg mounted to an elbow, the elbow rotatably mounted to a further handle leg, the further handle leg mounted to the elbow at a rear end of the further handle leg and to the handle collar at a forward end of the further handle leg, and a handle elbow lock member to selectively and rotatably lock the elbow relative to the further handle leg, and the handle leg including an illumination member mounted thereto, with a switch member mounted to the handle leg.

2. An apparatus as set forth in claim 1 wherein the lower rectangular framework includes a platform mounted coextensively thereon and the upper rectangular framework includes an upper platform coextensively mounted fixedly to a bottom surface of the upper rectangular framework, the upper platform including a recess formed medially through a rear edge of the upper platform to receive the handle leg therethrough when the handle leg is rotatable to a lowered locked position relative to the upper rectangular framework.

3. An apparatus as set forth in claim 2 further including a battery box mounted to a rear side edge of the lower platform including a battery therewithin interconnected with a light member to permit actuation of the light member.

4. An apparatus as set forth in claim 3 wherein the lower platform includes a predetermined number of apertures formed through the lower platform positioned forwardly of the battery, the apertures oriented in alignment relative to one another, and wherein the alignment is arranged parallel to the side edges of the lower platform, and the upper rectangular framework includes a forward side, the forward side including a predetermined number of "U" shaped engagement members, each "U" shaped engagement member in alignment with an associated aperture formed in the lower platform to accommodate a fishing pole.

5. An apparatus as set forth in claim 4 including a support stand collar, the support stand collar including a triangular support stand rotatably mounted thereon, the support stand defined by a triangular configuration, the triangular configuration defined by spaced legs joined at an apex, the apex pivotally mounted to the support stand collar, the support stand further including a base, the base arranged parallel to the elongate sides of the lower rectangular framework, and further including a support stand lock member mounted to the support stand collar to pivotally lock the support stand in a selective lowered and raised position.

6. An apparatus as set forth in claim 5 wherein the handle leg includes a handle secured at an upper terminal end of the handle leg, and a fastener strap mounted to the handle, and the fastener strap including a respective first and second hook and loop fastener patch mounted to a respective first and second end of the handle strap to permit securement of the handle strap to a transport vehicle.

* * * * *